United States Patent
Brox et al.

(10) Patent No.: US 12,494,232 B2
(45) Date of Patent: Dec. 9, 2025

(54) MITIGATING VOLTAGE OVERSHOOT AT A TRANSMISSION LINE

(71) Applicant: Micron Technology, Inc., Boise, ID (US)

(72) Inventors: Martin Brox, Munich (DE); Martin Bach, Munich (DE); Thomas Hein, Munich (DE)

(73) Assignee: Micron Technology, Inc., Boise, ID (US)

( * ) Notice: Subject to any disclaimer, the term of this patent is extended or adjusted under 35 U.S.C. 154(b) by 165 days.

(21) Appl. No.: 17/980,828

(22) Filed: Nov. 4, 2022

(65) Prior Publication Data

US 2024/0153542 A1 May 9, 2024

(51) Int. Cl.
*G11C 7/02* (2006.01)
*G11C 5/14* (2006.01)
*G11C 7/10* (2006.01)

(52) U.S. Cl.
CPC .................. *G11C 7/02* (2013.01); *G11C 5/14* (2013.01); *G11C 7/1039* (2013.01)

(58) Field of Classification Search
CPC ........... G11C 7/02; G11C 5/14; G11C 7/1039; G11C 7/1069; G11C 7/1057
See application file for complete search history.

(56) References Cited

U.S. PATENT DOCUMENTS

| | | | |
|---|---|---|---|
| 9,502,168 B1* | 11/2016 | Ler | H01L 23/64 |
| 9,571,155 B2* | 2/2017 | Malhotra | H04B 3/238 |
| 10,530,617 B2* | 1/2020 | Lin | G11C 29/50008 |
| 10,727,895 B1* | 7/2020 | Nguyen | H04B 1/44 |
| 10,797,658 B1* | 10/2020 | Raj | H03F 3/3022 |
| 10,897,279 B1* | 1/2021 | Liu | H02H 9/045 |
| 2007/0096720 A1* | 5/2007 | Clements | G01R 35/007 |
| | | | 324/601 |
| 2009/0039916 A1* | 2/2009 | Buchmann | G11C 7/1051 |
| | | | 326/38 |
| 2016/0056859 A1* | 2/2016 | Malhotra | H04B 3/238 |
| | | | 375/356 |
| 2021/0141747 A1* | 5/2021 | Jeong | G11C 7/222 |
| 2022/0383940 A1* | 12/2022 | Yang | G11C 11/4096 |

* cited by examiner

*Primary Examiner* — Douglas King
*Assistant Examiner* — Christopher Lane Reece
(74) *Attorney, Agent, or Firm* — Holland & Hart LLP

(57) ABSTRACT

Methods, systems, and devices for voltage overshoot mitigation at a device are described. The device may include a first driver circuit configured to generate data symbols on a transmission line and may include a second driver circuit configured to pre-emphasize the data symbols on the transmission line. The device may include a first inductor and a second inductor in series with the transmission line. A conductive line may couple the second driver circuit with a node, of the transmission line, that is between the first inductor and the second inductor.

20 Claims, 4 Drawing Sheets

MITIGATING VOLTAGE OVERSHOOT AT A TRANSMISSION LINE

FIELD OF TECHNOLOGY

The following relates to one or more systems for memory, including voltage overshoot mitigation.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION in some systems, a device, such as a transmitter, may include a driver circuit that generates data symbols (e.g., voltage pulses) over a transmission line that is coupled with a receiver. To increase the bandwidth of the transmitter, the transmitter may include a pre-emphasis driver circuit that pre-emphasizes (e.g., increases or decreases the voltage level of) the data symbols generated by the driver circuit. To compensate for the capacitance of the receiver, which may negatively affect signaling over the transmission line, a transmitter may include a T-coil that includes multiple inductors in series with the transmission line. But including both a pre-emphasis driver and a T-coil in a transmitter may result in voltage overshoot (e.g., excessive voltage) at the driver circuit of the transmitter, which in turn may negatively impact the performance or longevity of the transmitter, among other issues.

According to the designs and methods described herein, a pre-emphasis driver in a transmitter may be coupled with the transmission line so that voltage overshoot is reduced during use of the pre-emphasis driver and a T-coil. For example, the pre-emphasis driver may be coupled with a node of the transmission line that is between the first inductor in the T-coil and the second inductor in the T-coil. The node may be coupled with a circuit (e.g., an electrostatic discharge (ESD) circuit) that absorbs charge from the transmission line so that voltage overshoot is prevented or at least reduced at the driver circuit. Thus, the transmitter may benefit from both the pre-emphasis driver and the T-coil without exposing the driver circuit to excessive voltages that damage or wear out the driver circuit, among other benefits.

Features of the disclosure are initially described in the context of systems and devices as described with reference to FIG. 1. Features of the disclosure are described in the context of a transmitter and example waveforms as described with reference to FIGS. 2 through 3.

Figure 1:
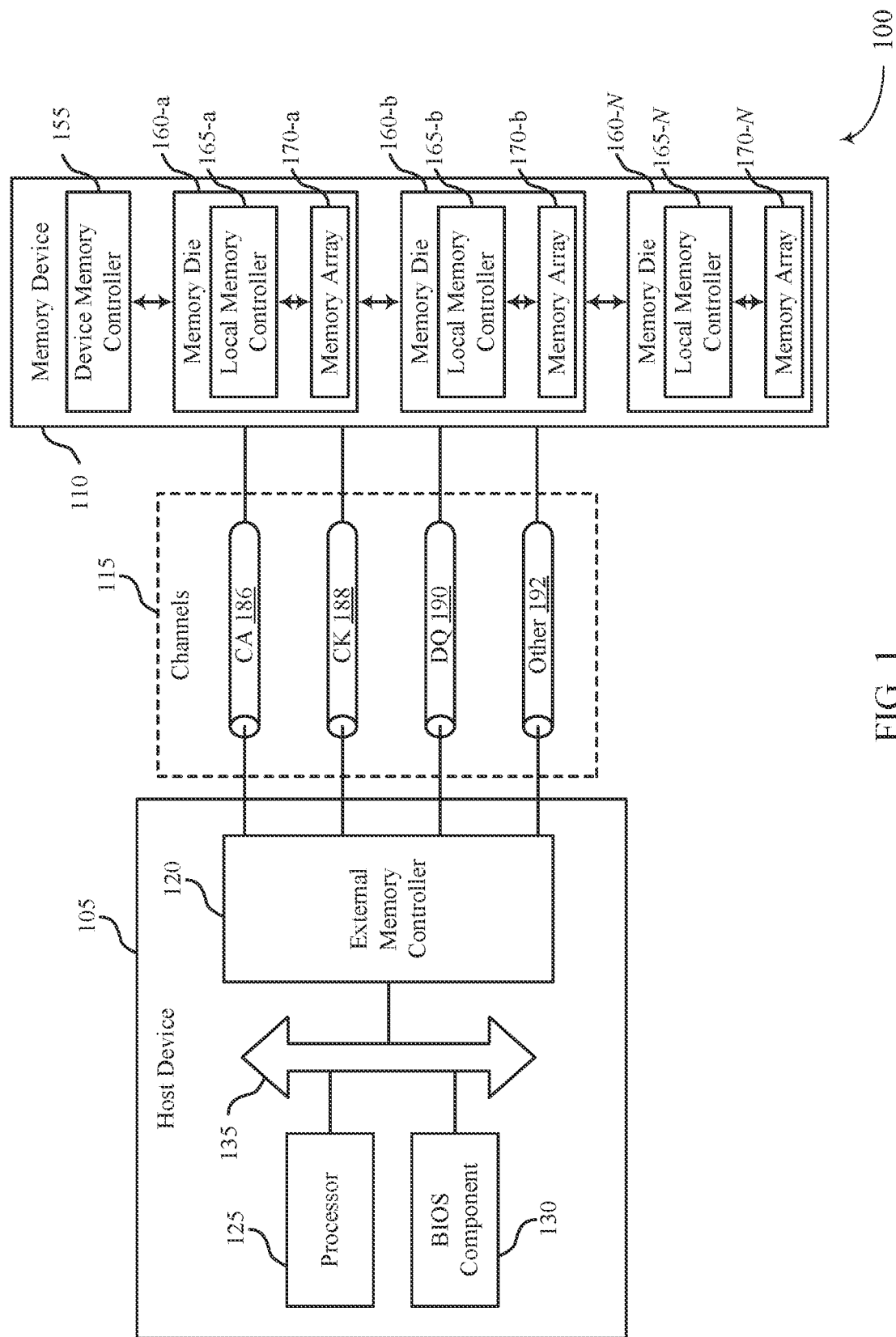
FIG. 1 illustrates an example of a system that supports voltage overshoot mitigation at a device in accordance with examples as disclosed herein.

FIG. 1 illustrates an example of a system 100 that supports voltage overshoot mitigation at a device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

Signals communicated over the channels 115 may be modulated using one or more different modulation schemes. In some examples, a binary-symbol (or binary-level) modulation scheme may be used to modulate signals communicated between the host device 105 and the memory device 110. A binary-symbol modulation scheme may be an example of a M-ary modulation scheme where M is equal to two. A symbol of a binary-symbol modulation scheme may be operable to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and others.

In some examples, a multi-symbol (or multi-level) modulation scheme may be used to modulate signals communicated between the host device 105 and the memory device 110. A multi-symbol modulation scheme may be an example of a M-ary modulation scheme where M is greater than or equal to three. A symbol of a multi-symbol modulation scheme may be operable to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and others. A multi-symbol signal (e.g., a PAM3 signal or a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

A device (e.g., the host device 105, the memory device 115) may include a transmitter that the device uses to communicate information over one or more transmission lines (e.g., a transmission line included in the channels 115). The transmitter may include a driver circuit for generating data symbols (e.g., voltage pulses representative of logic values) on a transmission line and may also include a pre-emphasis driver that improves the bandwidth of the transmitter by pre-emphasizing the data symbols. The device may also include a receiver that the device uses to receive information over the transmission line. To improve the performance of the receiver, it may be desirable for the transmission line to be coupled with a T-coil that compensates for the input capacitance of the receiver. But use of both a pre-emphasis driver and a T-coil may cause voltage overshoot at the transmitter when the device transmits information over the transmission line, which may impair the performance, durability, or both, of the transmitter.

According to the designs described herein, a transmitter may include a pre-emphasis driver and a T-coil configured in a manner that allows use of both circuits without excessive voltage overshoot. For example, the pre-emphasis driver may be coupled with the transmission line at a node that is between the inductors of the T-coil and that is coupled with a circuit (e.g., an ESD circuit).

Figure 2:
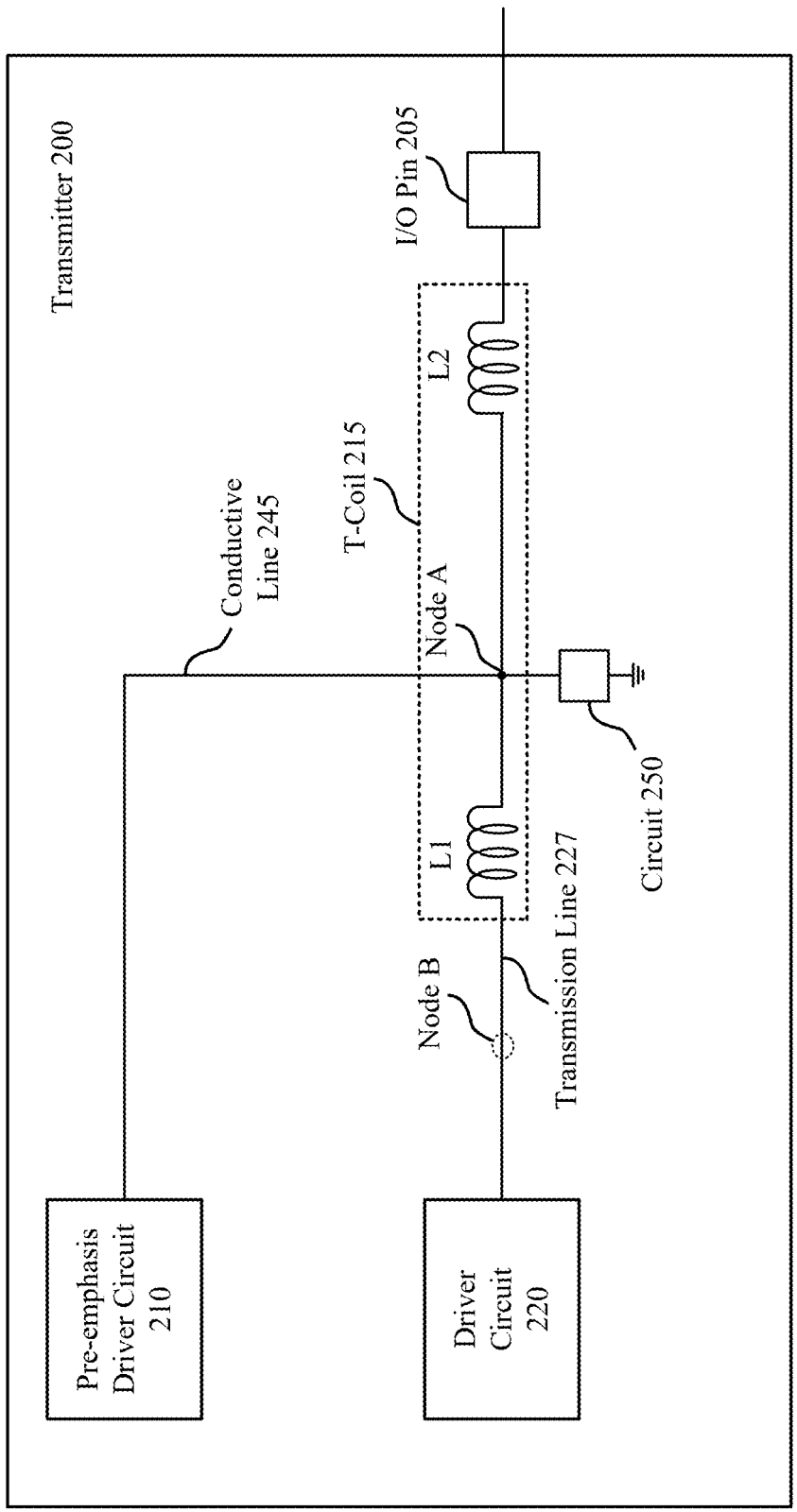
FIGS. 2 and 3 illustrate examples of circuitry that support voltage overshoot mitigation in accordance with examples as disclosed herein.

FIG. 2 illustrates an example of circuitry, such as a transmitter 200, that supports voltage overshoot mitigation in accordance with examples as disclosed herein. The transmitter 200 may be included in a device such as a host device 105 or a memory device 110 as described with reference to FIG. 1. The transmitter 200 may be configured to transmit signals (e.g., data symbols) to a receiver of another device via the transmission line 227 and the output (I/O) pin 205. The I/O pin 205 may also be referred to an output node, a package ball, or other suitable terminology. The transmitter 200 may include a pre-emphasis driver circuit 210 for increasing the bandwidth of the transmitter 200 and a T-coil for compensating for the capacitance of the receiver. The pre-emphasis driver circuit 210 may be coupled with the transmission line 227 in a manner that mitigates voltage overshoot at the transmitter 200 due to the T-coil 215.

In some examples, the transmitter 200 may include a circuit 250 with an input capacitance, such as an ESD circuit that is configured to mitigate electrostatic discharge on the transmission line 227 (which may otherwise damage or impair the operation of the transmitter 200). In other examples, the circuit 250 may include one or more capacitors, diodes (e.g., reverse-biased diodes), or transistors.

The driver circuit 220 may be configured to generate data symbols on the transmission line 227, where a data symbol may be represented by a voltage level during a symbol period. The pre-emphasis driver circuit 210 may be configured to pre-emphasize data symbols generated by the driver circuit 220 to improve the bandwidth of the transmitter 200. For example, the pre-emphasis driver circuit 210 may increase the voltage of data symbols that have a first voltage level and may decrease the voltage of data symbols that have a second voltage level that is lower than the first voltage level.

The T-coil 215 may include inductors that are in series with each other and the transmission line 227. For example, the T-coil 215 may include inductor L1 that is coupled with the driver circuit 220 and inductor L2 that is coupled with the I/O pin 205. Put another way, the inductor L1 may be between the inductor L2 and the driver circuit 220, whereas the inductor L2 may be between the inductor L1 and the I/O pin 205. The I/O pin 205 may be coupled with a receiver at another device (e.g., via an extension of the transmission line 227). A component x is between a component y and a component z if electrical charge flowing from component y to component z, or vice-versa, flows through component x.

The conductive line 245 may couple the pre-emphasis driver circuit 210 with the transmission line 227 at Node A, which may reduce voltage overshoot at the transmitter 200 relative to other configurations. For example, coupling the pre-emphasis driver circuit 210 with Node A, which is between inductor L1 and inductor L2 and coupled with the circuit 250, may reduce voltage overshoot compared to coupling the pre-emphasis driver circuit 210 with Node B, which is between the driver circuit 220 and the inductor L1 and separated from the circuit 250 via the inductor L1. Coupling the pre-emphasis driver circuit 210 with Node A may allow the circuit 250, which may have an input capacitance, to absorb excess charge during operation of the transmitter 200, thereby reducing voltage overshoot.

Thus, the pre-emphasis driver circuit 210 may be coupled with the transmission line 227 in a manner that mitigates voltage overshoot at the transmitter 200 due to the T-coil 215.

Figure 3:
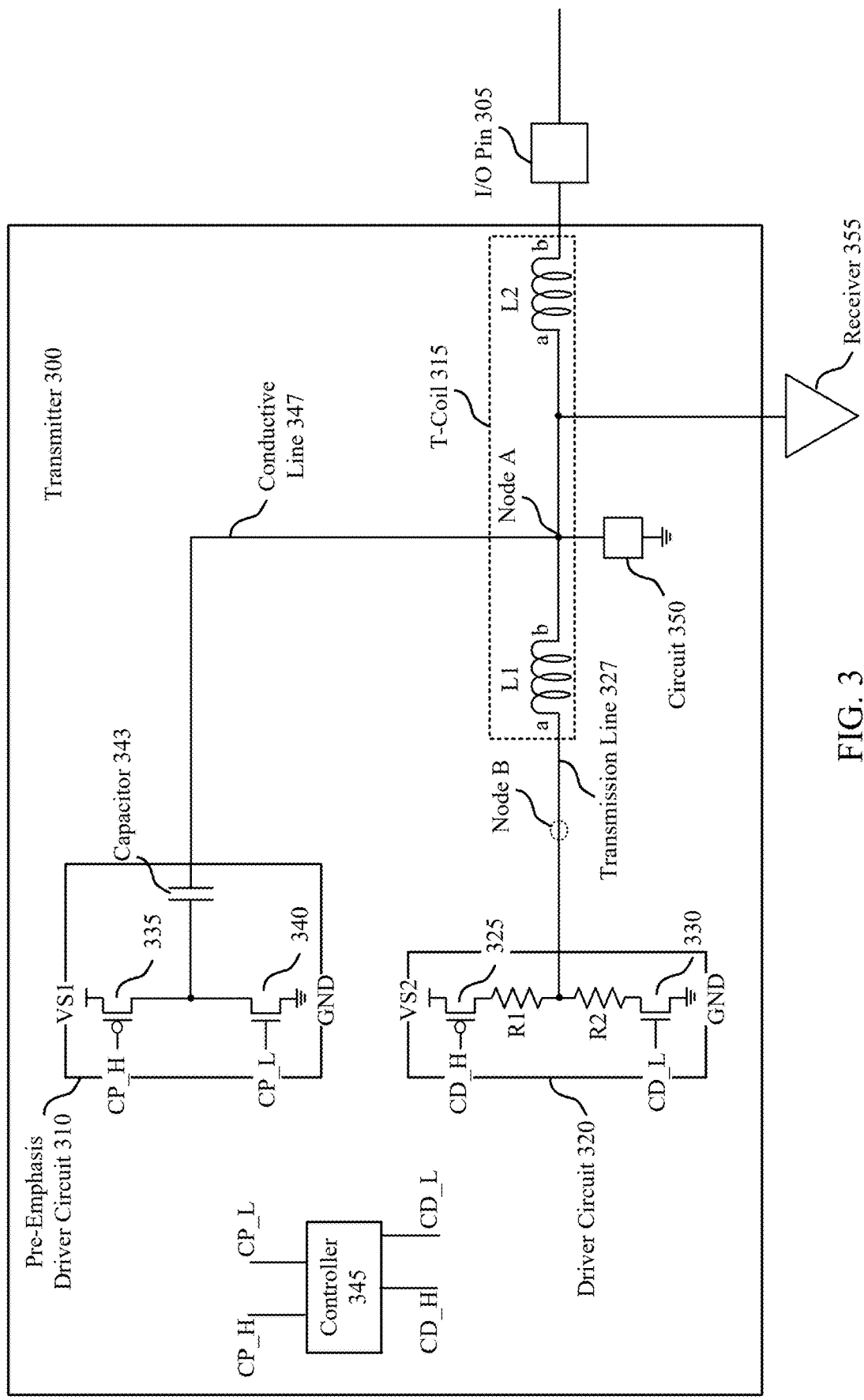

FIG. 3 illustrates an example of circuitry, such as a transmitter 300, that supports voltage overshoot mitigation in accordance with examples as disclosed herein. The transmitter 300 may be included in a device such as a host device 105 or a memory device 110 as described with reference to FIG. 1. The transmitter 300 may be an example of a transmitter 200 as described with reference to FIG. 2. The transmitter 300 may be coupled with an input/output (I/O) pin 305 that is coupled with a receiver at another device. The transmitter 300 may include a pre-emphasis driver circuit 310 and a T-coil 315 that are configured to reduce voltage overshoot at the transmitter 300. The T-coil 315 may include a first inductor, inductor L1, and a second inductor, inductor L2, that are in series with the transmission line 327.

The transmitter 300 may include a driver circuit 320 that is configured to generate data symbols on the transmission line 327. For example, the driver circuit 320 may be configured to generate voltage pulses (e.g., voltage levels) that are representative of different logic values. To illustrate, the driver circuit 320 may be configured to generate a first voltage level that is representative of a logic 1 and a second voltage level that is representative of a logic 0. Thus, in some examples, the driver circuit 320 may be configured as a PAM2 driver that uses pulse amplitude modulation (PAM) for two different levels, each of which is representative of a different logic value. However, the techniques described herein may be implemented for other types of drivers, such as a PAM4 driver that uses four levels.

The driver circuit 320 may include a switching component 325 and a resistor R1 configured as a pull-up circuit, and may include a switching component 330 and a resistor R2 configured as a pull-down circuit. For instance, the switching component 325 may be coupled with a voltage supply VS2 such that, if activated, the switching component 325 may transfer current to the transmission line 327 so that the voltage on the transmission line increases. If deactivated, the switching component 325 may isolate the transmission line 327 from the voltage supply VS2. The switching component 330 may be coupled with a ground reference node GND such that, if activated, the switching component 330 may transfer current from the transmission line 327 so that the voltage on the transmission line decreases. If deactivated, the switching component 330 may isolate the transmission line 327 from the ground reference node GND. In some examples, the resistor R1 and the switching component 325 may be referred to collectively as a first sub-circuit and the resistor R2 and the switching component 330 may be referred to collectively as a second sub-circuit. In some examples, a voltage supply may be referred to as a power supply, a voltage source, a power source, or other suitable terminology.

The pre-emphasis driver circuit 310 may be configured to pre-emphasize data symbols generated on the transmission line 327 by the driver circuit 320. For example, the driver circuit 320 may be configured to increase, at least for a portion of a symbol period, the voltage level of a data symbol generated by the pull-up circuit (e.g., the switching component 325 and the resistor R1) of the driver circuit 320. And the driver circuit 320 may be configured to decrease, at least for a portion of a symbol period, the voltage level of a data symbol generated by the pull-down circuit (e.g., the switching component 330 and the resistor R2) of the driver circuit 320.

The pre-emphasis driver circuit 310 may include a switching component 335 configured as a pull-up circuit, and may include a switching component 340 configured as a pull-down circuit. For instance, the switching component 335 may be coupled with a voltage supply VS1 such that, if activated, the pre-emphasis driver circuit 310 may transfer current to the transmission line 327 (e.g., via the capacitor 343) so that the voltage on the transmission line increases. If deactivated, the switching component 335 may isolate the transmission line 327 from the voltage supply VS1. The switching component 340 may be coupled with a ground reference node GND such that, if activated, the pre-emphasis driver circuit 310 may transfer current from the transmission line 327 (e.g., via the capacitor 343) so that the voltage on the transmission line decreases. If deactivated, the switching component 340 may isolate the transmission line 327 from the ground reference node GND. In some examples, the switching component 335 may be referred to as a first sub-circuit and the switching component 340 may be referred to as a second sub-circuit.

The T-coil may include inductor L1 and inductor L2, which may be coupled with the transmission line 327 in series so that the input capacitance of the receiver 355 and/or the circuit 330 is hidden or compensated (e.g., when the device 300 receives data over the transmission line 327). To reduce voltage overshoot at the driver circuit 320, the pre-emphasis driver circuit 310 may be coupled (via conductive line 347) with the transmission line 327 at node A. Node A may be between the inductor L1 and the inductor L2 and may be coupled with a circuit 350 (e.g., an ESD circuit). Coupling the pre-emphasis driver circuit 310 with the transmission line 327 at node A may allow the circuit 350 may absorb excess charge during operation of the transmitter 300 so that voltage overshoot at the driver circuit 320 is reduced relative to other configurations (e.g., coupling the pre-emphasis driver circuit 310 with the transmission line at node B).

So, the first terminal 'a' of the inductor L1 may be coupled with the driver circuit 320 (e.g., at the node between the resistor R1 and the resistor R2), and the second terminal 'b' of the inductor L1 may be coupled with the first terminal 'a' of the inductor L2. Further, the second terminal 'b' of the inductor L2 may be coupled with the I/O pin 305.

The driver circuit 320 and the pre-emphasis driver circuit 310 may be controlled (e.g., activated, deactivated) by various control signals. For example, the driver circuit 320 may be controlled by signal CD_H, which may activate/deactivate the switching component 325, and signal CD_L, which may activate/deactivate the switching component 330. Similarly, the pre-emphasis driver circuit 310 may be controlled by signal CP_H, which may activate/deactivate the switching component 335, and signal CP_L, which may activate/deactivate the switching component 340.

In some examples, the controller 345 may apply the control signals to the driver circuits. For example, the controller 345 may generate and apply one or more of the control signals CP_H, CP_L, CD_H, and CD_L to one or both of the driver circuits. In some examples, the controller 345 may be configured to activate the driver circuit 320 at the same time as the pre-emphasis driver circuit 310. In other examples, the controller 345 may be configured to activate the driver circuit 320 before activating the pre-emphasis driver circuit 310 (e.g., to account for delay introduced by the inductor L1). In some examples, the controller 345 may activate the driver circuit 320 before the pre-emphasis driver circuit 310 by applying signal CD_H (or signal DC_L) to the pre-emphasis driver circuit 310 before applying the signal CP_H (or CP_L) to the pre-emphasis driver circuit 310. To do so, the controller 345 may output the control signals at different times or the controller 345 may output the control signals at the same time and send the control signal for the pre-emphasis driver circuit 310 (e.g., signal CP_H, signal CP_L) through a delay circuit (e.g., a buffer) that is between the controller 345 and the pre-emphasis driver circuit 310.

In some examples, the transmitter 300 may share the I/O pin 305 with a receiver 355 for the device. For example, the receiver 355 may include an input terminal that is coupled with the transmission line 327 at node A. The receiver 355 may be configured to receive signals (e.g., data symbols) from a transmitter of a different device that is coupled with the I/O pin 305.

Thus, the transmitter 300 may include a pre-emphasis driver circuit 310 and a T-coil 315 that are configured to reduce voltage overshoot at the transmitter 300.

Figure 4:
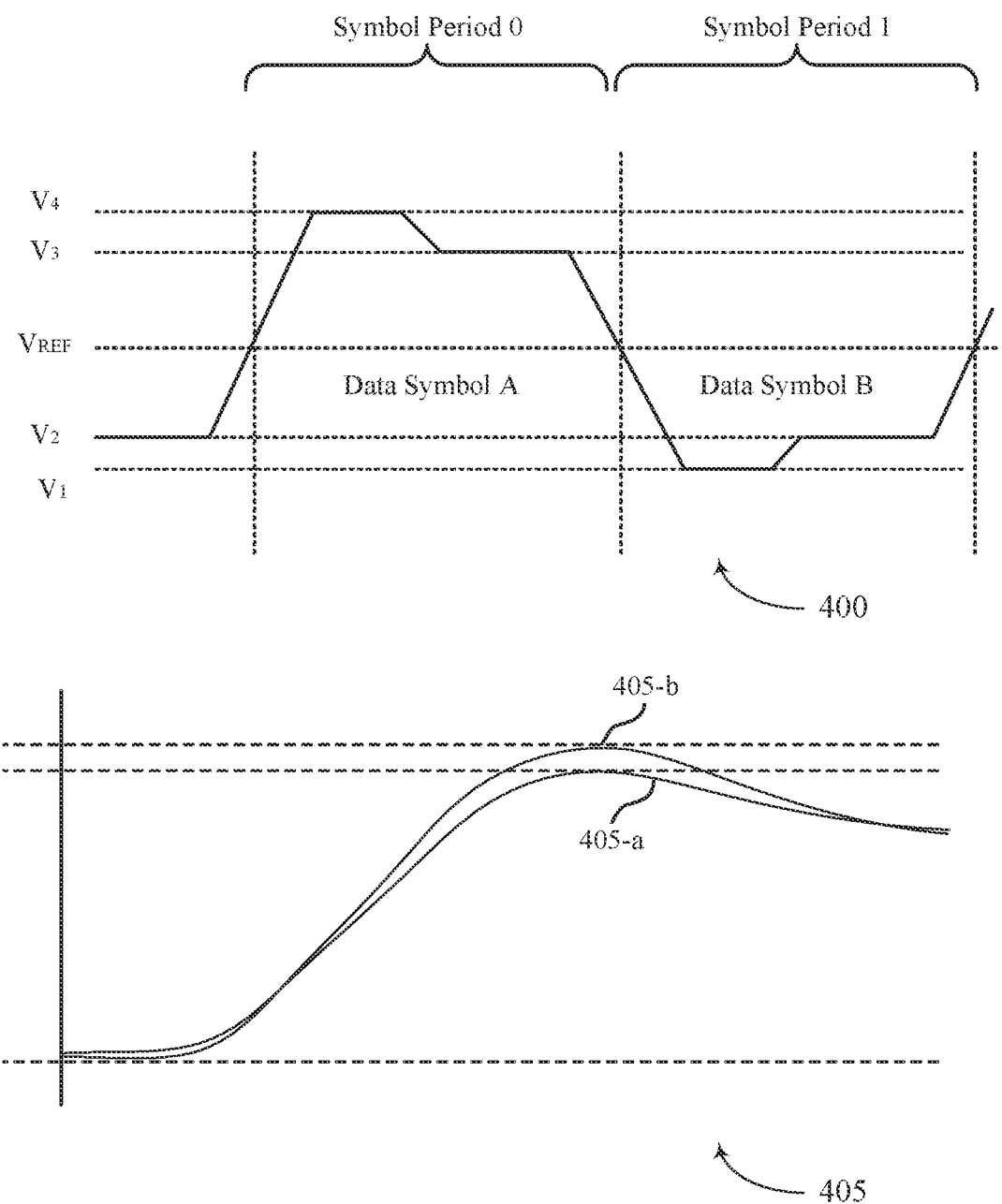
FIG. 4 illustrates an example of waveforms that support voltage overshoot mitigation a device in accordance with examples as disclosed herein.

FIG. 4 illustrates an example of waveforms that support voltage overshoot mitigation a device in accordance with examples as disclosed herein. The waveforms may include a waveform 400 and waveforms 405.

The waveform 400 may be an example of a pre-emphasized waveform. For example, the waveform 400 may be an example of two data symbols that are generated by the driver circuit 320 and pre-emphasized by the pre-emphasis driver circuit 310. The waveform 400 may include data symbol A, which is in symbol period 0, and data symbol B, which is symbol period 1. Data symbol A may include a first voltage level (e.g., voltage level $V_3$) that is representative of a first logic value (e.g., logic 1) and data symbol B may include a second voltage level (e.g., voltage level $V_2$) that is representative of a second logic value (e.g., logic 0). However, the voltage level of data symbol A may be increased (at least for a portion of the symbol period 0) to voltage level $V_4$ due to pre-emphasis by the pre-emphasis driver circuit 310, which may improve the ability of a receiver to receive data symbol A. Additionally, the voltage level of data symbol B may be decreased (at least for a portion of the symbol period 0) to voltage level $V_1$ due to pre-emphasis by the pre-emphasis driver circuit 310, which may improve the ability of a receiver to receive data symbol B.

The waveforms 405 may be examples of the voltage at Node B for two different transmitters. For example, waveform 405-a may be an example of the voltage at Node B for a transmitter that includes the pre-emphasis driver circuit 310 coupled with the transmission line 327 as illustrated in FIG. 3. And waveform 405-b may be an example of the voltage at Node B for a transmitter that includes the pre-emphasis driver circuit 310 coupled with the transmission line 327 is a manner other than that illustrated in FIG. 3. As seen in FIG. 4, waveform 405-a reaches voltage $V_A$, which may be a desired voltage for operating the transmitter 300, without overshooting voltage $V_A$ like waveform 405-b, which reaches voltage $V_B$, which may be a voltage level that is damaging to the transmitter 300.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 1: An apparatus, including: a first driver circuit configured to generate data symbols on a transmission line; a first inductor and a second inductor in series with the transmission line; a second driver circuit configured to pre-emphasize the data symbols on the transmission line; and a conductive line that couples the second driver circuit with a node, of the transmission line, that is between the first inductor and the second inductor.

Aspect 2: The apparatus of aspect 1, further including: a circuit coupled with the node that is between the first inductor and the second inductor and configured to mitigate electrostatic discharge on the transmission line.

Aspect 3: The apparatus of any of aspects 1 through 2, further including: a receiver coupled with the node that is between the first inductor and the second inductor.

Aspect 4: The apparatus of any of aspects 1 through 3, where the second driver circuit is configured to pre-emphasize the data symbols by being configured to: increase a voltage level of data symbols that are representative of a first logic value; and decreases a voltage level of data symbols that are representative of a second logic value.

Aspect 5: The apparatus of any of aspects 1 through 4, where the second driver circuit includes: a capacitor including a first terminal coupled with the node that is between the first inductor and the second inductor.

Aspect 6: The apparatus of aspect 5, where the second driver circuit includes: a first switching component coupled with a voltage supply; and a second switching component coupled with a ground reference, where a second terminal of the capacitor is coupled with a node between the first switching component and the second switching component.

Aspect 7: The apparatus of any of aspects 1 through 6, where the first driver circuit includes: a first switching component coupled with a voltage supply; and a second switching component coupled with a ground reference.

Aspect 8: The apparatus of aspect 7, where the first driver circuit includes: a first resistor between the first switching component and the first inductor; and a second resistor between the second switching component and the first inductor.

Aspect 9: The apparatus of any of aspects 1 through 8, further including: an I/O pin coupled with the transmission line, where the second inductor is between the first inductor and the I/O pin.

An apparatus is described. The following provides an overview of aspects of the apparatus as described herein:

Aspect 10: An apparatus, including: a driver circuit configured to generate a first data symbol on a transmission line and a second data symbol on the transmission line, the first data symbol representative of a first logic value and the second data symbol representative of a second logic value; a pre-emphasis driver circuit configured to increase a voltage of the first data symbol and to decrease a voltage level of the second data symbol; and a conductive line that couples a capacitor of pre-emphasis driver circuit with a node between two inductors that are in series with the transmission line.

Aspect 11: The apparatus of aspect 10, further including: a controller configured to activate the driver circuit and the pre-emphasis driver circuit at the same time.

Aspect 12: The apparatus of any of aspects 10 through 11, further including: a controller configured to activate the driver circuit before activating the pre-emphasis driver circuit.

Aspect 13: The apparatus of any of aspects 10 through 12, where the driver circuit includes: a first sub-circuit configured to generate the first data symbol; and a second sub-circuit configured to generate the second data symbol.

Aspect 14: The apparatus of aspect 13, where the pre-emphasis driver circuit includes: a first sub-circuit configured to increase the voltage of the first data symbol; and a second sub-circuit configured to decrease the voltage of the second data symbol.

Aspect 15: The apparatus of any of aspects 10 through 14, where the pre-emphasis driver circuit includes: a first switching component coupled with a voltage supply; a second switching component coupled with a ground reference; and the capacitor including a first terminal coupled with a node between the first switching component and the second switching component, and a second terminal coupled with the node between the two inductors.

Aspect 16: The apparatus of any of aspects 10 through 15, further including: a circuit coupled with the node between two inductors and configured to mitigate electrostatic discharge on the transmission line.

An apparatus is described. The following provides an overview of aspects of the apparatus as described herein:

Aspect 17: An apparatus, including: a driver circuit coupled with a transmission line; a first inductor and a second inductor coupled in series with the transmission line, the first inductor including a first terminal coupled with the driver circuit and a second terminal coupled with a first terminal of the second inductor; and a pre-emphasis driver circuit coupled with the second terminal of the first inductor and the first terminal of the second inductor.

Aspect 18: The apparatus of aspect 17, where the driver circuit includes: a first switching component coupled with the transmission line via a first resistor; and a second switching component coupled with the transmission line via a second resistor.

Aspect 19: The apparatus of aspect 18, where the first terminal of the first inductor is coupled with a node between the first resistor and the second resistor.

Aspect 20: The apparatus of any of aspects 18 through 19, where the first switching component is coupled with a voltage supply, and the second switching component is coupled with a ground reference node.

Aspect 21: The apparatus of any of aspects 17 through 20, where the pre-emphasis driver circuit includes: a first switching component coupled with a voltage supply; and a second switching component coupled with a ground reference.

Aspect 22: The apparatus of aspect 21, where the pre-emphasis driver circuit includes: a capacitor coupled with the second terminal of the first inductor, the first terminal of the second inductor, and a node between the first switching component and the second switching component.

Aspect 23: The apparatus of any of aspects 17 through 22, further including: an electrostatic discharge (ESD) circuit coupled with the second terminal of the first inductor and the first terminal of the second inductor and configured to mitigate electrostatic discharge on the transmission line.

Aspect 24: The apparatus of any of aspects 17 through 23, further including: an I/O pin coupled with the transmission line, where the second terminal of the second inductor is coupled with the I/O pin.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other w % ben the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A transmitter, comprising:
a first driver circuit configured to generate data symbols on a transmission line;
a first inductor and a second inductor in series with the transmission line;
a second driver circuit coupled with a node of the transmission line that is between the first inductor and the second inductor and configured to pre-emphasize the data symbols on the transmission line by driving current to the node of the transmission line;
a conductive line that couples the second driver circuit with the node, of the transmission line, that is between the first inductor and the second inductor, wherein the conductive line is configured to convey the current to the node;
an electrostatic discharge (ESD) circuit coupled with the node and the second driver circuit and configured to mitigate electrostatic discharge and voltage overshoot on the transmission line during operation of the first driver circuit, the ESD circuit comprising a first terminal coupled with the node between the first inductor and the second inductor, and comprising a second terminal coupled with a ground reference that is isolated from the node, wherein the first inductor and the second inductor are in series between the first driver circuit and an output pin of the transmitter; and
a control circuit coupled with the first driver circuit and coupled with the second driver circuit, wherein the control circuit is configured to activate the first driver circuit and the second driver circuit.

2. The transmitter of claim 1, wherein the second driver circuit is configured to pre-emphasize the data symbols by being configured to:
increase a voltage level of first data symbols of the data symbols, the first data symbols representative of a first logic value based at least in part on driving the current to the transmission line; and
decreases a voltage level of second data symbols of the data symbols, the second data symbols that are representative of a second logic value based at least in part on driving the current to the transmission line.

3. The transmitter of claim 1, wherein the second driver circuit comprises:
a capacitor comprising a first terminal coupled with the node that is between the first inductor and the second inductor.

4. The transmitter of claim 3, wherein the second driver circuit comprises:
a first switching component coupled with a voltage supply; and
a second switching component coupled with a ground reference, wherein a second terminal of the capacitor is coupled with a node between the first switching component and the second switching component.

5. The transmitter of claim 1, wherein the first driver circuit comprises:
a first switching component coupled with a voltage supply; and
a second switching component coupled with a ground reference.

6. The transmitter of claim 5, wherein the first driver circuit comprises:

a first resistor between the first switching component and the first inductor; and
a second resistor between the second switching component and the first inductor.

7. The transmitter of claim 1, wherein the second inductor is between the first inductor and the IO output pin.

8. A transmitter, comprising:
a driver circuit configured to generate a first data symbol on a transmission line and a second data symbol on the transmission line, the first data symbol representative of a first logic value and the second data symbol representative of a second logic value;
a pre-emphasis driver circuit configured to increase a voltage of the first data symbol and to decrease a voltage level of the second data symbol by driving current to the transmission line at a node between two inductors that are in series with the transmission line;
a conductive line that couples a capacitor of the pre-emphasis driver circuit with the node between the two inductors that are in series with the transmission line and is configured to convey the current to the node;
a control circuit coupled with the driver circuit and coupled with the pre-emphasis driver circuit, wherein the control circuit is configured to activate the driver circuit and the pre-emphasis driver circuit; and
an electrostatic discharge (ESD) circuit coupled with the node and the pre-emphasis driver circuit and configured to mitigate electrostatic discharge and voltage overshoot on the transmission line during operation of the driver circuit, the ESD circuit comprising a first terminal coupled with the node between the two inductors, and comprising a second terminal coupled with a ground reference that is isolated from the node, wherein the two inductors are in between the driver circuit and an output pin of the transmitter.

9. The transmitter of claim 8, the control circuit further comprising:
a controller configured to activate the driver circuit and the pre-emphasis driver circuit at the same time.

10. The transmitter of claim 8, the control circuit further comprising:
a controller configured to activate the driver circuit before activating the pre-emphasis driver circuit.

11. The transmitter of claim 8, wherein the driver circuit comprises:
a first sub-circuit configured to generate the first data symbol; and
a second sub-circuit configured to generate the second data symbol.

12. The transmitter of claim 11, wherein the pre-emphasis driver circuit comprises:
a first sub-circuit configured to increase the voltage of the first data symbol; and
a second sub-circuit configured to decrease the voltage of the second data symbol.

13. The transmitter of claim 8, wherein the pre-emphasis driver circuit comprises:
a first switching component coupled with a voltage supply;
a second switching component coupled with a ground reference; and
the capacitor comprising a first terminal coupled with a node between the first switching component and the second switching component, and a second terminal coupled with the node between the two inductors.

14. A transmitter, comprising:
a driver circuit coupled with a transmission line;
a first inductor and a second inductor coupled in series with the transmission line, the first inductor comprising a first terminal coupled with the driver circuit and a second terminal coupled with a first terminal of the second inductor;
a pre-emphasis driver circuit coupled with the second terminal of the first inductor and the first terminal of the second inductor via a conductive line coupled with the transmission line and configured to drive current to pre-emphasize data symbols on the transmission line;
a control circuit coupled with the driver circuit and coupled with the pre-emphasis driver circuit, wherein the control circuit is configured to activate the driver circuit and the pre-emphasis driver circuit; and
an electrostatic discharge (ESD) circuit coupled with the pre-emphasis driver circuit and a node between the first inductor and the second inductor and configured to mitigate electrostatic discharge and voltage overshoot on the transmission line during operation of the driver circuit, the ESD circuit comprising a first terminal coupled with the node between the first inductor and the second inductor, and comprising a second terminal coupled with a ground reference that is isolated from the node, wherein the first inductor and the second inductor are in between the driver circuit and an output pin of the transmitter.

15. The transmitter of claim 14, wherein the driver circuit comprises:
a first switching component coupled with the transmission line via a first resistor; and
a second switching component coupled with the transmission line via a second resistor.

16. The transmitter of claim 15, wherein the first terminal of the first inductor is coupled with a node between the first resistor and the second resistor.

17. The transmitter of claim 15, wherein the first switching component is coupled with a voltage supply, and wherein the second switching component is coupled with a ground reference node.

18. The transmitter of claim 14, wherein the pre-emphasis driver circuit comprises:
a first switching component coupled with a voltage supply; and
a second switching component coupled with a ground reference.

19. The transmitter of claim 18, wherein the pre-emphasis driver circuit comprises:
a capacitor coupled with the second terminal of the first inductor, the first terminal of the second inductor, and a node between the first switching component and the second switching component.

20. The transmitter of claim 14, wherein a second terminal of the second inductor is coupled with the output pin.

* * * * *